United States Patent
Brodt et al.

(10) Patent No.: US 6,196,622 B1
(45) Date of Patent: Mar. 6, 2001

(54) REAR STRUCTURE OF A UNITIZED MOTOR VEHICLE BODY AND METHOD FOR IT MANUFACTURE

(75) Inventors: Martin Brodt, Renningen; Rudolf Nowak, Boeblingen; Joerg Zimmerman, Freiberg, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/392,649

(22) Filed: Sep. 9, 1999

(30) Foreign Application Priority Data

Sep. 9, 1998 (DE) ............................................. 198 41 100

(51) Int. Cl.⁷ .................................................. B62D 25/08
(52) U.S. Cl. ................. 296/195; 296/203.04; 296/37.16
(58) Field of Search ..................... 296/195, 193, 296/198, 203.04, 203.01, 188, 37.16

(56) References Cited

U.S. PATENT DOCUMENTS 6,022,069 * 2/2000 Birkwald et al. .................... 296/204

FOREIGN PATENT DOCUMENTS

| 3718841A1 | 12/1988 | (DE) . |
| 4431970A1 | 3/1996 | (DE) . |
| 19618258A1 | 11/1997 | (DE) . |
| 0 270 097 A1 | * 6/1988 | (EP) . |
| 2055636 | 5/1971 | (FR) . |
| 1782842 A1 | * 12/1992 | (SU) . |

* cited by examiner

Primary Examiner—Joseph D. Pape
Assistant Examiner—Patricia Engle
(74) Attorney, Agent, or Firm—Evenson, McKeown, Edwards & Lenahan, P.L.L.C.

(57) ABSTRACT

A rear structure of a unitized motor vehicle body with two side wall sections includes a transverse wall located below a rear window cutout. The transverse wall connects the sidewall sections with one another, and has two cross members spaced apart from one another, between which a flat part extends. The first cross member, adjacent to the rear window cutout, is fitted with zero play between the side wall sections and a bearing is provided for the second cross member on each side. The bearing ensures an adjustability of the second cross member between the side wall sections at least in the transverse direction of the vehicle. The flat part is a trim member connected exclusively with the two cross members.

17 Claims, 3 Drawing Sheets

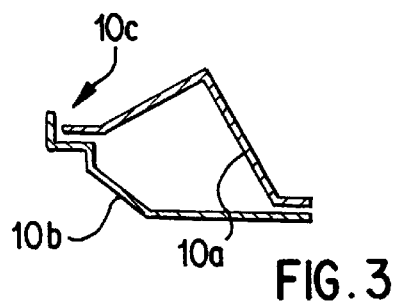
FIG. 3
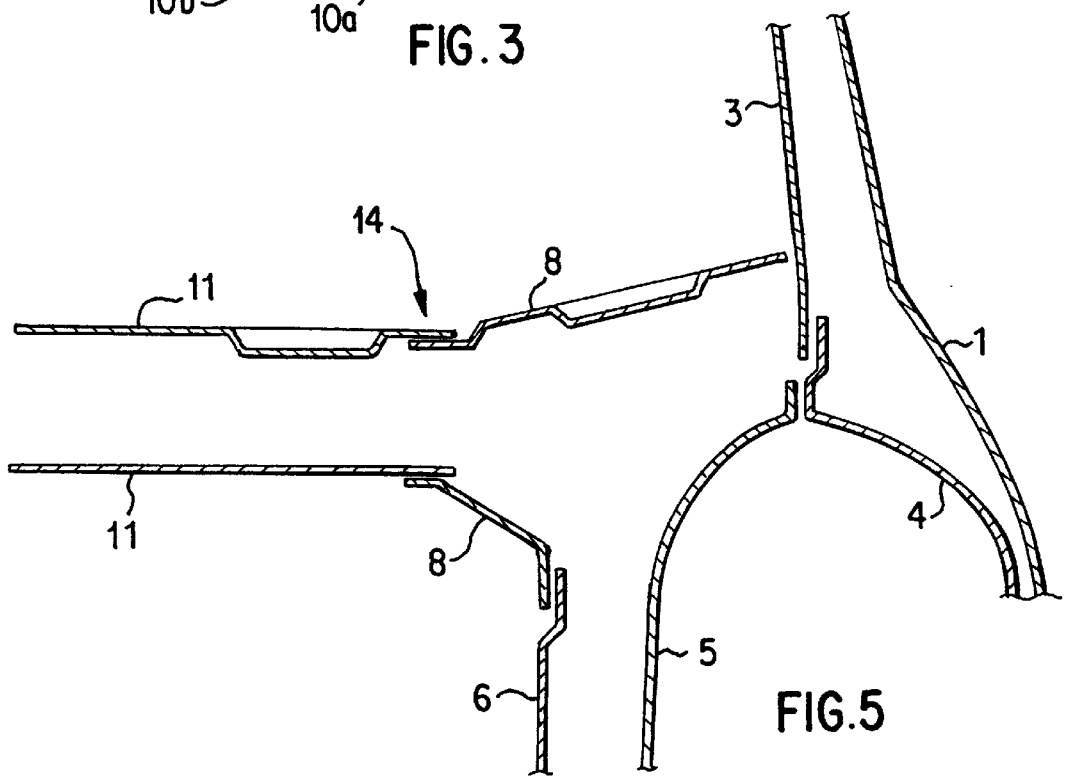
FIG. 5
FIG. 4
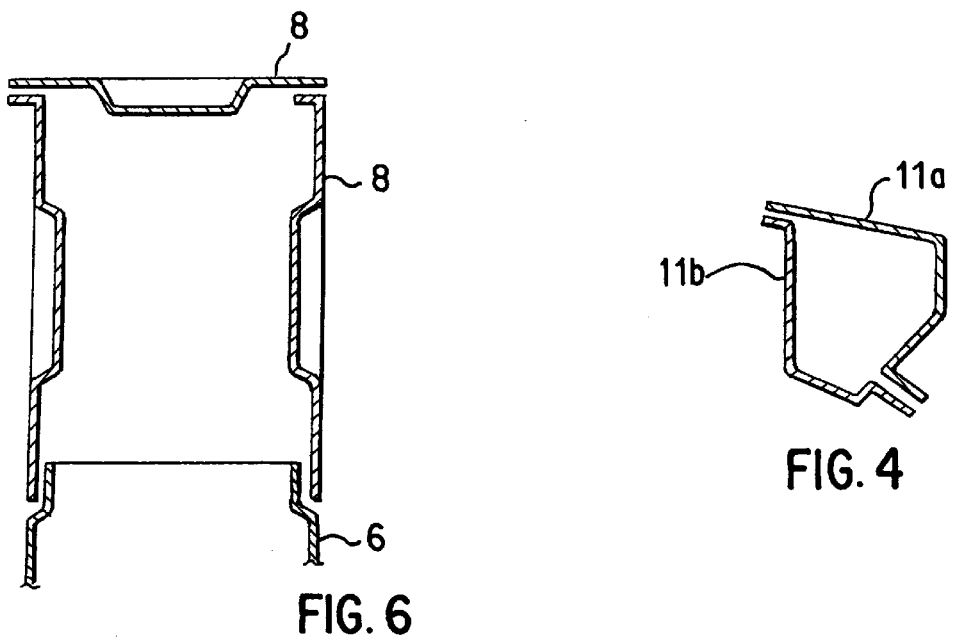
FIG. 6

REAR STRUCTURE OF A UNITIZED MOTOR VEHICLE BODY AND METHOD FOR IT MANUFACTURE

BACKGROUND AND SUMMARY OF THE INVENTION

This application claims the priority of German application 198 41 100.6, filed in Germany on Sep. 9, 1998, the disclosure of which is expressly incorporated by reference herein.

The invention relates to a rear structure of a unitized motor vehicle body with two side wall sections between which a transverse wall connecting the side wall sections with one another is located below a rear window cutout, said wall having two cross members spaced apart from one another between which a flat part extends, and a method for manufacturing the rear structure.

A floor area for a motor vehicle with a rear engine is known from French Patent 2 055 636 in which two cross members are located, positioned exactly between two side members, and on which a flat floor structure is placed to fit exactly. As a result, a supporting frame for the motor vehicle engine and a unitized motor vehicle body are obtained, but no means are disclosed for adjusting the parts relative to one another.

German Patent Document DE 196 18 258 A1 teaches a motor vehicle frame that is composed of a plurality of members that are extruded profiles. The members have flat contact areas that guarantee tolerance compensation in both the lengthwise and transverse directions of the vehicle.

German Patent Document DE 44 31 970 A1 teaches a motor vehicle body in which a body panel is welded to a floor panel on opposite sides, forming a wheel housing. The floor panel for this purpose has matching welding flanges on its opposite sides, said flanges being connected by a bead to the floor panel. This bead allows deformation of the floor panel transversely to the plane of the welding flange.

German Patent Document DE 37 18 841 A1 teaches a frame arrangement for a motor vehicle in which positioning means are provided by means of which the side member of the frame arrangement can be pivoted individually or jointly around an axis directed transversely to its lengthwise extent. As a result, tolerances can be compensated that can occur regarding the symmetric arrangement of both side members when mounting body parts such as fenders, headlights, bumpers, and the like.

A goal of the invention is to provide a rear structure of the type recited at the outset and a method for its manufacture in which an accommodation of the transverse wall between the side wall sections that is free of stress is made possible using an arrangement that is as simple as possible.

This goal is achieved according to the invention by providing a rear structure of a unitized motor vehicle body with two side wall sections between which a transverse wall is located below a rear window cutout that connects the side wall sections to one another, said transverse wall having first and second cross members spaced apart from one another and a flat part extending between the cross members, wherein the first cross member is located adjacent to the rear window cutout, and is fitted without play between the side wall sections, wherein a bearing is provided on each side of the second cross member, said bearings guaranteeing an adjustability of the second cross member between the side wall sections at least in a transverse direction of the vehicle, and wherein the flat part is connected exclusively with the first and second cross members.

The flat part in particular preferred embodiments constitutes an interior part of the vehicle interior in which loudspeaker receptacles or other additional functions are integrated.

In the rear structure according to preferred embodiments, the first cross member is fitted between the side wall sections and abutting the rear window cutout. An exact positioning of the side wall sections relative to one another is made possible by these cross members at a point at which a vehicle rear window is provided.

In addition, preferred embodiments of the invention include provisions for locating the second cross member between the side wall sections so that it can be adjusted at both ends by bearings. As a result, it is possible to compensate for manufacturing tolerances so that the arrangement of side wall sections and cross members can be aligned free of stress and symmetrically and then secured in place. The flat part can likewise be mounted free of stress in the positioned cross member.

By means of the method according to preferred embodiments of the invention, the assembly of the rear structure can be adapted free of stress to existing manufacturing tolerances, and at the same time an exact alignment of the rear window cutout is guaranteed.

An advantageous feature of preferred embodiments of the invention is provided wherein the first cross member has a flange as a supporting part for a motor vehicle rear window that corresponds with window supporting flanges in the side wall sections.

Thus, together with the alignment of the side wall sections, securing the rear window cutout including the bearing face for the rear window is achieved so that small manufacturing tolerances are guaranteed at this point.

With preferred embodiments, wherein the second cross member has a locking structure for securing a folding rear seatback to the second cross member, locking structure, especially latching locks to secure a folding rear seatback to the second cross member, is provided and advantageously aligned together with the second cross member.

According to preferred embodiments, wherein the flat part is designed as a nonsupporting trim part, the flat part can be severely limited in its function and hence also in its mass or its stabilizing properties so that the cost and weight of the vehicle can be reduced.

Advantageous features of preferred embodiments of the method according to the invention include fitting the flat part to the cross members. The flat part is mounted on the positioned cross member, with positional tolerances of the cross member being compensated without difficulty by suitable design of the flat part.

Other objects, advantages and novel features of the present invention will become apparent from the following detailed description of the invention when considered in conjunction with the accompanying drawings.

BRIEF DESCRIPTION OF THE DRAWINGS

FIG. 3 is a cross section through a first cross member along section line III—III in FIG. 2;

FIG. 4 is a cross section through a second cross member along section line IV—IV in FIG. 2;

FIG. 5 is a cross section through a part of the rear structure along section line V—V in FIG. 2; and FIG. 6 is a cross section of a console of the second cross member serving as a bearing, along section line VI—VI in FIG. 2.

DETAILED DESCRIPTION OF THE DRAWINGS

Figure 1:
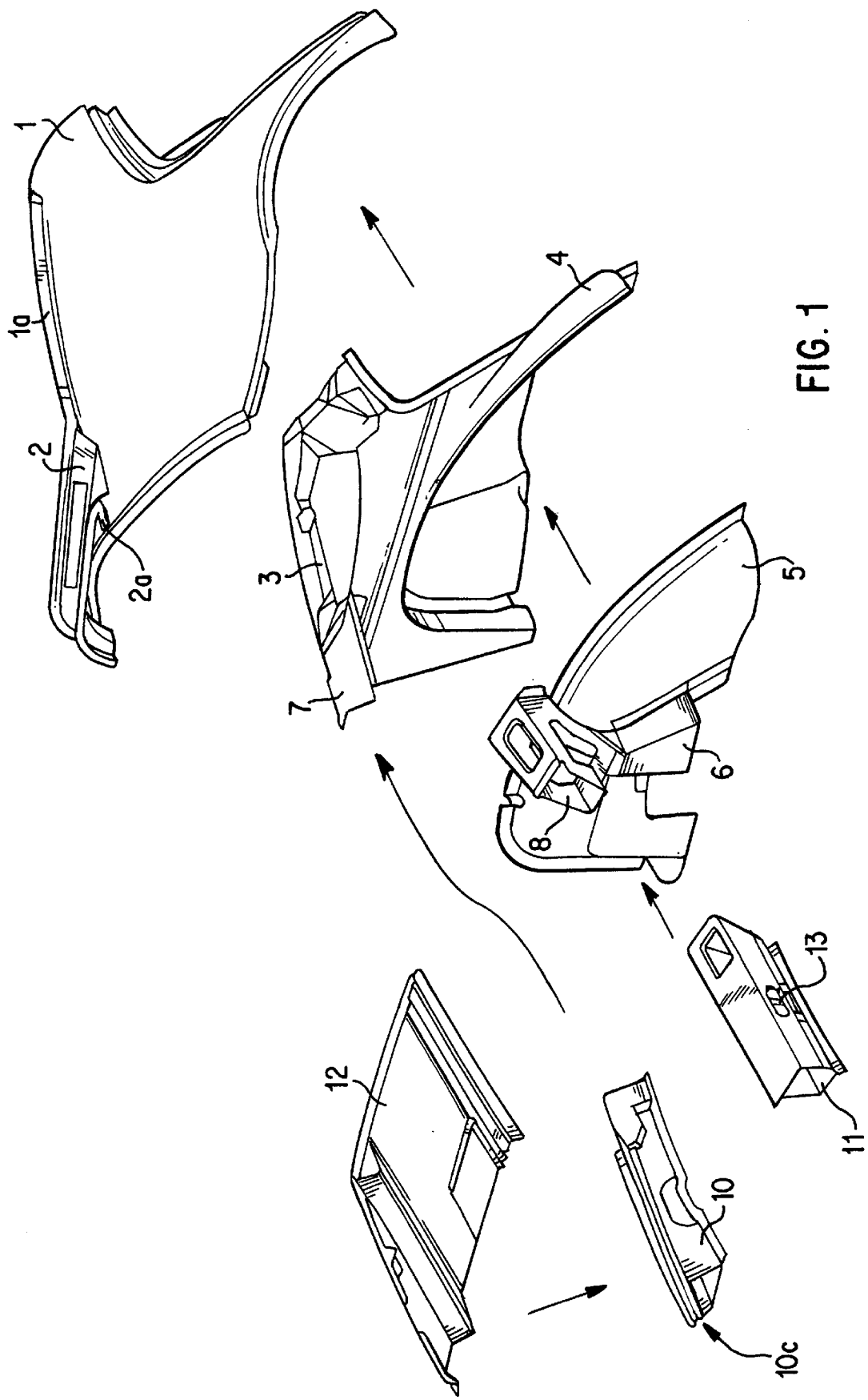
FIG. 1 shows in an exploded schematic view the part of a rear structure according to the invention on the driver's side.
Figure 2:
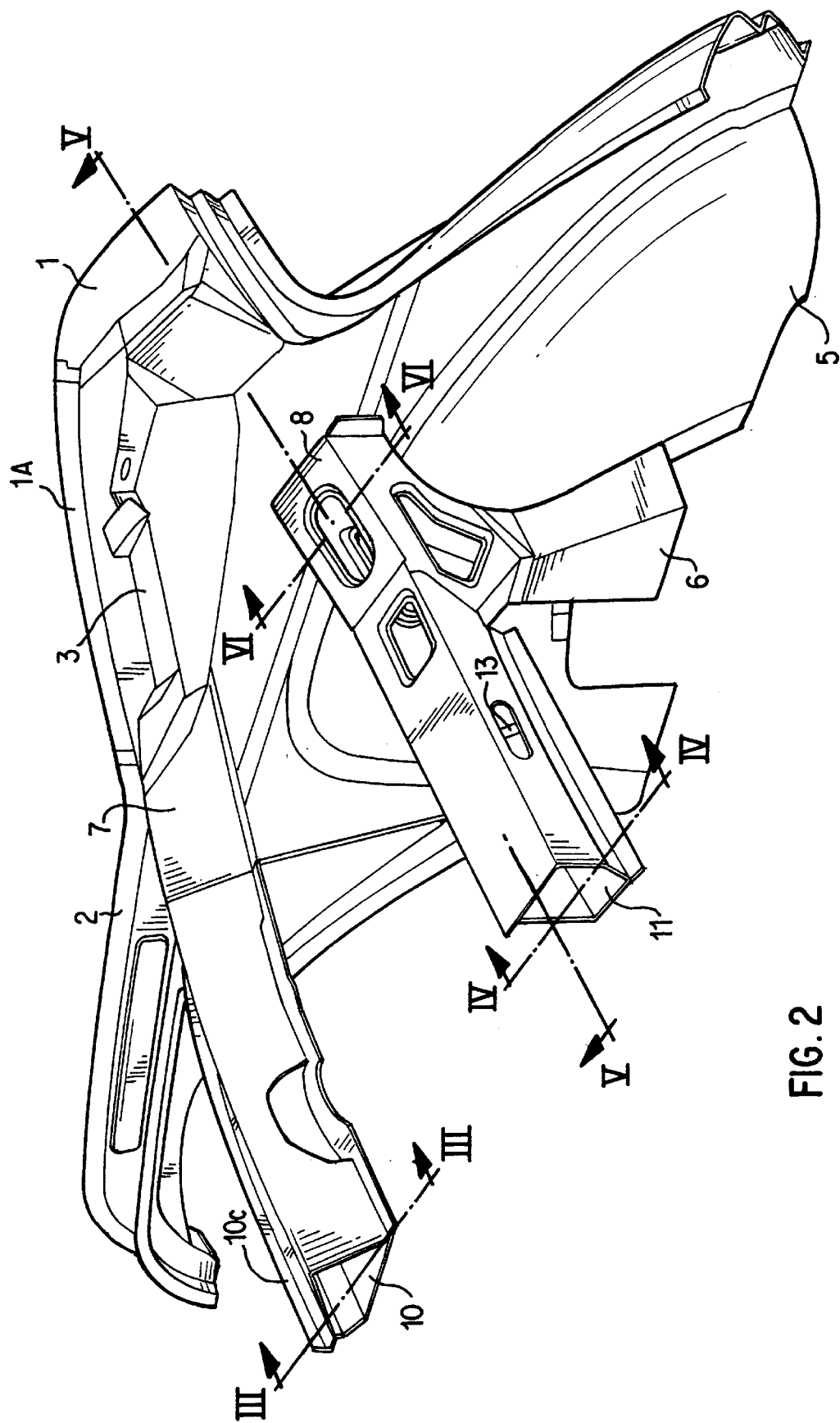
FIG. 2 is an assembly drawing of this part of the rear structure according to FIG. 1.

A rear structure of an automobile is shown according to the invention in the figures, said automobile being located on the left side looking in the direction of travel. A part of the rear structure that is made as a mirror image relative to the lengthwise axis is located on the side of the automobile that is on the right looking in the travel direction, but is not shown in the drawings. The following explanations therefore relate to the left side of the rear structure that is shown, but are equally applicable to the right side which is mirror symmetrical with the left side shown.

As shown in FIG. 1, the rear structure has a side wall section 1 to 5 made of several parts. In detail, these parts are an external cladding 1 with a welded-on part 2 projecting therefrom, an inner wall 3 of the C-pillar, an outer part 4 of the wheel well, as well as an inner part 5 of the wheel well. These parts are fitted together in conventional fashion to form a side wall section that can be combined with other side wall sections to form a complete vehicle side wall.

In the vicinity of the rear window cutout of the vehicle, on the inside wall 3 of the C-pillar, an intermediate element 7 is attached, projecting inward. In addition, a reinforcement 6 pointing in the direction of the vertical axis of the vehicle is located on the inside of inner part 5 of the wheel well, said reinforcement making a transition on its upper side directly to a console 8. Console 8 is connected by its outwardly oriented side both with the inner part 5 of the wheel well and with the inside wall 3 of the C-pillar. This is particularly evident from the section in FIG. 5. Console 8 thus forms an upper termination for reinforcement 6 and provides a particular reinforcement of the vehicle body in the vicinity of the wheel well or the rear axle of the vehicle.

Between the side wall section on the left side shown and the right-hand side wall section opposite, a transverse wall 10, 11, 12 is fitted that serves as a package shelf and a body cross bracing, said wall being composed of the following parts: rear middle section 10, front cross member 11, and trim 12.

The rear middle section 10 that serves as the first cross member is composed of two sheet metal profiles 10a and 10b and has a cross section that can be seen in FIG. 3. Rear middle section 10 is connected on the one hand by intermediate element 7, to which it is precisely fitted in the transverse direction of the vehicle, with the inside wall 3 of the C-pillar. On the other hand, it abuts against welded-on part 2 with a flange 10c.

The second front cross member 11, which, as can be seen from FIG. 4, is likewise built up from two sheet metal profiles, is inserted in a linearly displaceable fashion in the transverse direction of the vehicle into console 8. It is also evident from FIG. 5 that the front cross member 11 at point 14 has a certain play relative to console 8 and therefore also with respect to side wall section 1–5. This play serves to accommodate adjustment of the front cross member 11 in the transverse direction of the vehicle. In a modified embodiment, an adjustability of the front cross member 11 can be provided also in the direction of the vertical axis of the vehicle. On the other hand, the proposed guidance of the front cross member 11 in console 8 is likewise suitable for permitting small pivoting movements for adjusting the side wall sections relative to one another and with respect to cross member 11, with the contact point between the rear middle section 10 and the welded-on part 2 and/or the contact point between the rear middle section 10 and the intermediate section 7 being provided as reference points, since the flange 10c must be continued as a supporting part for the motor vehicle rear window without significant tolerances for the side wall sections and the vehicle roof.

The front cross member 11 forms the receptacle for headrests not shown and locking latches 13, that serve as locking structure to secure a folding rear seatback to the front cross member 11, which also forms a stop for the rear seatback. The adjustability provided for the front cross member 11 can thus be used to align the position of the cross member itself and especially also to align the latching locks 13 to the installation situation of the rear seat.

The trim 12 designed as a flat part can be mounted on the rear middle section 10 and the front cross member 11, and has a sufficient installation tolerance relative to the side wall sections. Trim 12 is also adjustable in the transverse direction of the vehicle, so that a system, which can be fitted completely without stress between the side wall sections of the vehicle, is formed of the two cross members 10, 11 and the trim 12. The trim 12 then assumes a subordinate function regarding the cross bracing of the body and serves only as a cover for the luggage compartment, a receptacle for loudspeakers, and a parcel shelf.

In a modified embodiment, provision is made for designing the rear middle section 10 in such fashion that it overlaps the welded-on part 2 and the intermediate section 7 to the point where, as in the case of the front cross member 11, play is obtained in the transverse direction of the vehicle.

In a method for producing the rear structure of a unitized motor vehicle body, in a separate manufacturing process, outer cladding 1, welded-on part 2, inside wall 3 of the C-pillar, outside part 4 of the wheel well, and inner part 5 of the wheel well are fitted together in succession to form a side wall section. For this purpose, these parts can be fitted together in a previous manufacturing step from individual parts or with one another to form assemblies. In a subsequent stage of the work, intermediate section 7, reinforcement 6, and console 8 are added to the preassembled side wall section. As already mentioned earlier, the mirror symmetry of the rear structure relative to the vehicle lengthwise axis means that such a procedure can be provided for both a right-hand side wall section and a left-hand side wall section.

Between the side wall sections built up as described above, in a first method step the method according to the invention places the rear middle section 10 over the intermediate section 7 and the front cross member 11 over the console 8 between the side wall sections. Then the rear middle section 10 fits largely shapewise to the intermediate section 7 and welded-on part 2, while the upper cross member is inserted within limits in the transverse direction of the vehicle displaceably into console 8 and is aligned centrally between the two side wall sections. The system is then aligned for exact positioning of the modules, whereupon first the rear middle section 10 and then the upper cross member 11 are fixed in place, welded in particular. In a subsequent method step, the trim 12 made in the form of a flat part is placed on the rear middle section 10 and the front cross member 11.

The proposed method for producing a rear structure permits an increased manufacturing tolerance in most parts yet permits a stress-free assembly of the transverse wall that connects the side wall sections of the rear structure with one another. An overdetermination of the parts (close dimensional tolerances) present in a conventional method when assembling a rear structure according to the species is eliminated so that an additional freedom of design in developing the contact flange for the rear window and the latching locks for the rear seatback is obtained.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Rear structure of a unitized motor vehicle body with two side wall sections between which a transverse wall is located below a rear window cutout that connects the side wall sections to one another, said transverse wall having first and second cross members spaced apart from one another and a flat part extending between the cross members, wherein the first cross member is located adjacent to the rear window cutout, is fitted without play between the side wall sections, wherein a bearing is provided on each side of the second cross member, said bearings guaranteeing an adjustability of the second cross member between the side wall sections at least in a transverse direction of the vehicle, and wherein the flat part is connected exclusively with the first and second cross members.

2. Rear structure according to claim 1, wherein the first cross member has a flange as a supporting part for a motor vehicle rear window that corresponds with window supporting flanges in the side wall sections.

3. Rear structure according to claim 1, wherein the second cross member has a locking structure for securing a folding rear seatback to the second cross member.

4. Rear structure according to claim 2, wherein the second cross member has a locking structure for securing a folding rear seatback to the second cross member.

5. Rear structure according to claim 1, wherein the flat part is designed as a nonsupporting trim part.

6. Rear structure according to claim 2, wherein the flat part is designed as a nonsupporting trim part.

7. Rear structure according to claim 3, wherein the flat part is designed as a nonsupporting trim part.

8. Rear structure according to claim 4, wherein the flat part is designed as a nonsupporting trim part.

9. Method for producing a rear structure of a unitized motor vehicle body, with two side wall sections between which, and beneath a rear window cutout, a transverse wall is located that connects the side wall sections with one another, said wall being composed of first and second cross members spaced apart from one another and a flat part that extends between the cross members, said method comprising:
inserting the first cross member with zero play between the side wall sections, and
inserting the second cross member between the side wall sections with play at least in the transverse direction of the vehicle, the second cross member being aligned centrally to the side wall sections, and
securing both cross members to the side wall sections.

10. Method according to claim 9, further comprising fitting a flat part to the secured cross members.

11. Method according to claim 10, wherein said flat part is connected exclusively with the first and second cross members.

12. Method according to claim 9, wherein the first cross member has a flange as a supporting part for a motor vehicle rear window that corresponds with window supporting flanges in the side wall sections.

13. Method according to claim 9, wherein the second cross member has a locking structure for securing a folding rear seatback to the second cross member.

14. Method according to claim 12, wherein the second cross member has a locking structure for securing a folding rear seatback to the second cross member.

15. Method according to claim 10, wherein the flat part is designed as a nonsupporting trim part.

16. Method according to claim 15, wherein the first cross member has a flange as a supporting part for a motor vehicle rear window that corresponds with window supporting flanges in the side wall sections.

17. Method according to claim 16, wherein the second cross member has a locking structure for securing a folding rear seatback to the second cross member.

* * * * *